(12) United States Patent
Burgess et al.

(10) Patent No.: US 11,046,534 B2
(45) Date of Patent: Jun. 29, 2021

(54) APPARATUS AND PROCESS FOR HANDLING FOOD PACKAGING

(71) Applicant: Conopco, Inc., Englewood Cliffs, NJ (US)

(72) Inventors: Geoffrey Alec Burgess, Wellingborough (GB); Gianfelice Romano, Bedford (GB); Paul Leonard Sherwood, Rushden (GB)

(73) Assignee: Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 15/749,793

(22) PCT Filed: Jul. 25, 2016

(86) PCT No.: PCT/EP2016/067658
§ 371 (c)(1),
(2) Date: Feb. 2, 2018

(87) PCT Pub. No.: WO2017/029075
PCT Pub. Date: Feb. 23, 2017

(65) Prior Publication Data
US 2018/0222694 A1 Aug. 9, 2018

(30) Foreign Application Priority Data
Aug. 19, 2015 (EP) ..................................... 15181519

(51) Int. Cl.
*B65G 59/10* (2006.01)
*A47F 1/10* (2006.01)
(Continued)

(52) U.S. Cl.
CPC ........... *B65G 59/10* (2013.01); *A23G 7/0025* (2013.01); *A23G 7/0075* (2013.01); *A47F 1/106* (2013.01); *B65G 59/00* (2013.01)

(58) Field of Classification Search
CPC ...... B65G 59/10; B65G 59/00; A23G 7/0075; A23G 7/0025; A47F 1/106
(Continued)

(56) References Cited

U.S. PATENT DOCUMENTS 1,609,581 A   12/1926   Smith
1,704,695 A   3/1929    Baker
(Continued)

FOREIGN PATENT DOCUMENTS

DE   1607946   9/1970
DE   2639172   3/1978
(Continued)

OTHER PUBLICATIONS

Written Opinion in EP16742308; Written Opinion in EP16742308; dated Jun. 18, 2018.
(Continued)

*Primary Examiner* — Lynn E Schwenning
(74) *Attorney, Agent, or Firm* — Gerard J. McGowan, Jr.

(57) ABSTRACT

The invention provides an apparatus for separating a cone sleeve (4) from a nested stack of cone sleeves (1) the apparatus comprising a chamber (2) having an upper (7) and a lower (8) surface connected by a wall or walls (6), the upper surface (7) having an upper circular opening (3) and the lower surface (8) having a lower circular opening (5) characterized in that the upper circular opening (3) has a circumference of from 100-135% of the maximum circumference of the cone sleeve (4), the lower circular opening (5) has a circumference of from 95-99.5% of the maximum circumference of the cone sleeve (4), and the chamber (2) has inlets (9) connectable to a pressurized gas supply. The invention also provides process that employs the apparatus, the process comprising the steps of providing a stack of nested cone sleeves (1); placing the lowermost end of the
(Continued)

stack into the chamber (2) from above the chamber (2); and allowing the lowermost cone sleeve (4) to sit within the lower circular opening (5) and allowing the cone sleeves above the lower-most cone sleeve (4) to protrude from the top of the chamber (2) characterized in that pressurized gas is introduced into the chamber via the inlets (9) thereby to create an elevated pressure within the chamber (2).

14 Claims, 2 Drawing Sheets

(51) Int. Cl.
  *A23G 7/00* (2006.01)
  *B65G 59/00* (2006.01)
(58) Field of Classification Search
  USPC .................................. 414/795.6; 221/261
  See application file for complete search history.

(56) References Cited

U.S. PATENT DOCUMENTS

| | | | |
|---|---|---|---|
| 1,839,637 A | 1/1932 | Barbieri | |
| 2,369,933 A | 2/1945 | Amberg | |
| 2,371,668 A | 3/1945 | Balton | |
| 2,445,713 A | 7/1948 | Glassner | |
| 2,738,899 A | 3/1956 | Hansen | |
| 2,792,967 A | 5/1957 | Dixon | |
| 2,937,786 A | 5/1960 | Muller | |
| 3,211,329 A | 10/1965 | Boyd | |
| 3,268,116 A | 8/1966 | Gass et al. | |
| 3,323,680 A * | 6/1967 | Beer | B65G 59/106 221/221 |
| 3,540,621 A | 11/1970 | Pilliner | |
| 4,241,848 A | 12/1980 | Young | |
| 4,439,101 A * | 3/1984 | Orlowski | B65G 59/101 221/11 |
| 4,741,458 A | 5/1988 | Odorici | |
| 4,881,660 A | 11/1989 | Suttles | |
| 4,927,319 A * | 5/1990 | Montali | B65B 57/20 221/277 |
| 5,014,878 A | 5/1991 | Janz | |
| 6,048,014 A | 4/2000 | Stefanik | |
| 6,418,701 B1 * | 7/2002 | Navarro | B65B 7/2807 221/223 |
| 6,623,236 B1 | 9/2003 | Barnes | |
| 8,021,099 B1 * | 9/2011 | van der Griendt | B65G 59/10 414/795.6 |
| 9,271,582 B1 * | 3/2016 | Pando | A47F 1/106 |
| 2002/0092791 A1 | 7/2002 | Wnek | |
| 2005/0077314 A1 | 4/2005 | Boykin et al. | |
| 2005/0111961 A1 * | 5/2005 | Thiele | A23G 7/0025 414/795.6 |
| 2011/0229297 A1 * | 9/2011 | Frazier | B65G 59/10 414/795.6 |

FOREIGN PATENT DOCUMENTS

| | | |
|---|---|---|
| DE | 3342510 | 6/1985 |
| EP | 1471007 | 10/2004 |
| EP | 2397413 | 12/2011 |
| FR | 2740761 | 5/1997 |
| GB | 731699 | 6/1955 |
| GB | 911724 | 11/1962 |
| GB | 1136968 A | 12/1968 |
| GB | 1139698 | 12/1968 |
| GB | 1463274 | 2/1977 |
| GB | 1586858 | 3/1981 |
| GB | 2178016 | 2/1987 |
| GB | 2215320 | 9/1989 |
| GB | 2233968 | 1/1991 |
| GB | 2239450 | 7/1991 |
| JP | 5661275 | 5/1981 |
| JP | 61023025 | 1/1986 |
| JP | 4055216 | 2/1992 |
| JP | 2002019732 | 1/2002 |
| JP | 2015000812 | 1/2015 |
| WO | WO9600632 | 1/1996 |
| WO | WO9944479 | 9/1999 |
| WO | WO13087801 | 6/2013 |

OTHER PUBLICATIONS

Search Report & Written Opinion in EP15181519, dated Feb. 23, 2016.
Search Report and Written Opinion in EP15181517, dated Feb. 17, 2016.
Search Report and Written Opinion in EP15181518, dated Feb. 19, 2016.
Search Report and Written Opinion in PCTP2016067658, dated Oct. 14, 2016.

* cited by examiner

APPARATUS AND PROCESS FOR HANDLING FOOD PACKAGING

FIELD OF THE INVENTION

The present invention relates to an apparatus and process for handling packaging for food items. In particular, the invention relates to an apparatus and process for handling sleeves for ice cream cones.

BACKGROUND OF THE INVENTION

Ice cream cone products such as Cornetto are well known and popular with consumers. Such products comprise a wafer cone, typically coated on the inside with a chocolate-based material, and filled with a frozen confection. These cones are typical ice cream cones with an opening at one end tapering to a point at the other. More specifically these cones are hollow conical three-dimensional objects with a circular opening at one end into which the frozen confection is introduced and at the other end the wall of the cone terminates at the tip of these cones. The walls of these cones taper in a substantially straight line from the circular opening to the tip.

Products such as Cornettos are provided in a sleeve in which the cone sits that is usually made from a paper-based material such as coated paper based material or multi-layered paper material. The sleeve serves to support and protect the cone and its contents during production and also protects the final product in the supply chain. During consumption the sleeve also provides a holder for consumers, allowing them to eat the product without necessarily making contact with the cone itself.

Cone sleeves are normally made from a blank which, prior to rolling, has a shape akin to an isosceles triangle but where the third edge is a curve. More specifically such a blank has the form of a circular sector which can be described by taking two lines from the center of a circle out to the edge. These lines form two edges of the circular sector and each have a length equal to the radius of the circle. The other edge of the sector is the arc of the circle between the two lines. The central angle θ of the sector is the angle formed between the two lines where they meet at the center of the circle. For the sake of clarity, a sector with a central angle of 180° is a semicircle, quadrants have a central angle of 90°, sextants have a central angle of 60°, and octants have a central angle of 45°. When such blanks are rolled to form the cone shape they will form a pointed tip and are suitable as sleeves for cones having a similar shape.

During manufacture of ice cream cone products the cone sleeves are usually provided as nested stacks wherein a multitude of cone sleeves are produced, one inside another and then delivered to the point of manufacture of the ice cream cone products.

These nested stacks of cone sleeves present particular challenges in the manufacture of ice cream cone products. As can be appreciated, it is advantageous to have large stacks with many cone sleeves in order to allow large scale highly automated production of the products. The stacks are loaded into stack holders which are typically hollow tubes or similar cartridges from which the bottom of the stack protrudes. The lowermost sleeve is taken from the bottom of the stack using an automated picking device of some kind. A cone is then placed inside the sleeve and then filled with the additional components of the ice cream cone to make the final product. However, it is difficult to consistently and accurately remove the lowermost sleeve from these nested stacks. This is because the sleeves have a tendency to wedge together due to the natural fit between the identically shaped sleeves. This wedging is particularly prevalent when the cone sleeves are manufactured at a different site to the production of the ice cream cones because the nested cone stacks are exposed to vibrations in transport causing the sleeves to nest together even more firmly. As a consequence of the sleeves packing tightly one within another, a vacuum is created between them that must be overcome when removing each sleeve. It is therefore a common problem that a sleeve cannot be removed from the bottom of a stack by an automated picking device. It is also a common problem that more than one sleeve is removed from the stack. It will therefore be appreciated that this creates considerable problems in the large scale manufacture of ice cream cone products such as those described above.

Moreover, consumers are increasingly demanding new and interesting product formats and new cone shapes are being developed. Round tipped cones are one such cone shape. In these variants the cone does not have a point where the wall of the cone terminates. Instead, the cone has a large, rounded tip. Standard sleeve blanks, the resulting sleeves, and the associated sleeve forming apparatuses and processes are all directed towards forming traditional cone sleeves having a pointed tip. Such sleeves are unsuitable for round tipped cones. As can be appreciated, if a round tipped cone is placed in a standard cone sleeve the rounded tip of the cone will not extend to the tip of the sleeve and there will be a void at the bottom of the sleeve. The tip of the cone sleeve is therefore not filled with the tip of a cone and is easily damaged during manufacture, transport and storage. Furthermore, the visual cue of the round tipped cone which has been carefully manufactured will be completely hidden if a standard pointed cone sleeve is used.

WO2013/087801 therefore provides a process for the preparation of an ice cream cone sleeve with a rounded tip comprising the steps of: a) providing a forming element having the shape of a round tipped ice cream cone with a cone angle α and also providing a forming cavity having an internal surface corresponding to the shape of the forming element, b) placing a cone sleeve having a cone angle α within the forming cavity, c) engaging the forming element within the cone sleeve, and d) forcing the forming element and the forming cavity together wherein the cone sleeve has a frustoconical shape and an open tip and wherein the end of the sleeve protrudes beyond the end of the forming element in step c).

It will be appreciated that round tipped cone sleeves do not have the pointed tip of standard cone sleeves. With such standard cone sleeves, the ends of the pointed tips tend to engage one inside another in the stack and to some extent prevent the sleeves from packing any more tightly in the nested stack. In contrast, round tipped cone sleeves do not have pointed tips and the round tipped sleeves are therefore even more capable of tightly packing together and a vacuum forms both at the wall area and at the rounded tip. As a consequence, the issues of denesting are even more prevalent with round tipped items. It is also the case that the round tipped cone sleeves of WO2013/087801 are produced from precursor cone sleeves that have a frustoconical shape and an open tip. These precursor cone sleeves are also provided in a nested stack and in the absence of any tip the packing of the these items is unfettered and they are especially prone to tight wedging and are particularly difficult to separate individually from a nested stack.

There is therefore a need for an apparatus and process that is capable of addressing the issues caused by packed stacks of cone sleeves where the cone sleeves have become too tightly packed or even wedged together. Moreover, there is a need for an apparatus and process that can be used for cone sleeves having normal pointed tips, or for rounded tips, or even for the precursor cone sleeves above which have no tips at all.

Various approaches have been utilized in the past in order to address some of the issues associated with separating items provided in nested stacks.

US20020092791 discloses that a pressed container is formed having a peripheral sidewall, a continuous bottom wall along the lower edge of the sidewall, and an outwardly directed peripheral rim along the upper edge of the sidewall and wherein an inwardly directed bulge is provided along the upper edge of the sidewall and an outwardly directed bulge is provided along the upper edge of the sidewall that cooperates with the inwardly directed bulge of an adjacent container when stacked in nesting relationship to uniformly stack the containers in nested relationship for easy separation of the containers. It can therefore be appreciated that US20020092791 attempts to solve the problem of easy separation of the containers. However, it does so through structural changes to the items that are stacked whereas in the case of the cone sleeves of the present invention it is necessary to maintain the original shape that consumers demand.

GB911724 discloses a device wherein cones from a tube fall to a lower pair of fingers which grip a lower lip of the cone and when a cycle of operations is initiated by inserting a coin a solenoid is energized to cause pins to open the lower fingers for release of the cones and to allow closure of upper fingers below an upper lip of the succeeding cone. When the lower jaws open then the bottom cone falls off under gravity. The cones and cone sleeves envisaged in the present invention do not have any lip features.

GB1136968 discloses a device for drawing containers individually from a stack, the device comprising a gripping device with at least one clamping member moveable by air pressure variation to clamp and release side walls of the lowermost container. However, this device does not specifically address the issue of packed stacks of cone sleeves where the cone sleeves have become too tightly packed or even wedged together and although it provides a means to remove a container it does not ensure that one container is disengaged from another.

U.S. Pat. No. 6,048,014 discloses a sanitary ice cream cone handling device that can have prongs or tines which can work in conjunction with a securing clip and a weight or plunger piece arrangement. This device is manually positioned beneath the stack and therefore is not suitable for automated manufacture. Moreover, any issues resulting from packed stacks of cone sleeves where the cone sleeves have become too tightly packed or even wedged together will have to be dealt with in a manual fashion by the operator.

U.S. Pat. No. 1,704,695 discloses a device for dispensing ice cream cones, having: a base, a pair of cone supporting members mounted thereon, adapted to be moved toward each other to engage the exposed part of one cone in a nested stack of cones and assume the support thereof; springs whereby said members are so moved, a manually operable member whereby to separate said supporting members and allow said cone to drop, and means for arresting said dropping cone at a point which brings the next cone in the stack into position to receive similar support when said supporting members are again subjected to the action of said springs. As with the previous disclosure, this device is manually positioned beneath the stack and therefore is not suitable for automated manufacture, and any issues resulting from packed stacks of cone sleeves where the cone sleeves have become too tightly packed or even wedged together will have to be dealt with in a manual fashion by the operator.

U.S. Pat. No. 2,371,668 discloses means by which jackets are fed from a magazine into carriages or holders, the holders brought to a loading station where cones are placed in the jackets, then the jackets are brought to their final positions and locked to the cones automatically, after which the jacketed cones are discharged from the machine into a suitable receptacle. It also discloses a set of feed elements or wipers having wings. These feed elements are preferably composed of rubber or other suitable resilient and yieldable substance. However, although this device provides a means to remove a container it does not address the issue of packed stacks of cone sleeves where the cone sleeves have become too tightly packed or even wedged together and therefore the means do not ensure that one container is disengaged from another in such circumstances.

GB1463274 discloses an apparatus whereby cones are released successively from the bottoms of each stack by an upper assembly of horizontally movable jaws, a lower assembly of jaws, and a downwardly and horizontally moving stripper assembly having stripper fingers. In this disclosure the stripper fingers engage with a lip on the cones to be separated. Although this disclosure deals with the issue of separating cones and cone sleeves it relies on the cone sleeves having a lip whereas sleeves, especially those of the present invention, typically do not have such a lip.

U.S. Pat. No. 3,268,116 discloses a method for feeding a flexible, open-top container from a substantially vertical nested stack of such containers onto a conveyor, the method comprising supporting the bottom container in said nested stack on opposite sides, attaching suction cups on opposite sides of said bottom container, the sides to which the suction cups are attached being different from the sides being supported, moving said suction cups slightly outwardly then inwardly insuring the release of any grip said bottom container may have on the stack of containers, pulling said suction cups downwardly to strip said last container from said stack of containers, releasing the suction in said suction cups, withdrawing said suction cups and allowing said container to drop freely onto a conveyor. However, this method requires that the containers are deformed in order to be removed. Such deformation may not be acceptable due to the potential damage to the sleeves and in any event it is difficult to balance adequate deformation such that the sleeves are denested against the potential to damage the sleeves when deforming them.

U.S. Pat. No. 2,445,713 discloses a machine which comprises a magazine for the cones, a magazine for the jackets, a receiver for the jackets and cones, mechanism for removing the jackets, one at a time, from their magazine and placing them in the receiver. The mechanism for removing the jackets uses a plug having a bore with a lateral duct or port that terminates at a groove. When a jacket is sucked into the groove it deforms such that it can be removed from the stack. Again, this deformation may not be acceptable due to the potential damage to the sleeves and it is difficult to balance adequate deformation such that the sleeves are denested against the potential to damage the sleeves when deforming them.

Certain separating devices employ pneumatic elements in the apparatus and/or processes used.

GB2239450 discloses an apparatus for denesting a stack of containers, the apparatus comprising a first container engaging means, a second container engaging means, each of these means being a pair of opposed plates which is spaced from the first container engaging means in a direction which is, in use, substantially aligned with the stack, and drive means in the form of a cam arrangement for selectively and alternately moving the first and second container engaging means into and out of engagement with the stack whereby the first and second engaging means alternately hold an end container of the stack thereby to release a previous end container from the stack. In the apparatus a valve head is provided with air connection means which connect to opposed hollow upright rods of the magazine which are disposed substantially along the central line between the pairs of top and bottom plates. These hollow upright rods are provided with downwardly-inclined slots which are directed inwardly towards the center and the bottom of the denester assembly and can act to cause radially inwardly and downwardly directed jets of air to assist in the denesting operation. In the denesting operation the bottom container drops under the action of gravity and is blown down by air jets from slots out of the denester assembly. It can therefore be appreciated that the pneumatic elements of this disclosure are used to blow the container down after it has been released due to gravity and is not suitable for addressing the issue of packed stacks of cone sleeves where the cone sleeves have become too tightly packed or even wedged together.

GB2215320 discloses an apparatus for use in separating containers one after another from a stack that has a denesting station, an inclined chute for advancing the container stack progressively to bring each currently leading container to the said station; a hinged plate; actuator means operable to cause the hinged plate to rock cyclically towards and away from the said station and an air nozzle arrangement operable during each cycle under the control of air valve means to deliver a flow of gas to impinge on the plate and spread thereacross at the time when the plate is in contact with the currently leading container so that air penetrates between the currently leading and next succeeding container thereby to separate the currently leading container from the stack; the so separated container adhering to the plate as it moves away from the denesting station and being released from the plate at a later time during the cycle. GB2215320 states that the effect of air penetration between the leading container and the container stack is, firstly, to maintain the leading container adherent to the plate as the plate moves in its return stroke away from the denesting station, and, secondly, to provide a reaction pressure holding the next succeeding container nested in the remainder of the stack whilst disturbing the nested state of the few next succeeding containers in a sense to reduce possibly substantial static friction between adjacent ones of such containers without destroying their nested configuration. It also states that such light disturbance clearly primes such adjacent containers for release from the stack during following cycles of operation. However, the present invention is directed to the issue of packed stacks of cone sleeves where the cone sleeves have become too tightly packed or even wedged together such that they cannot be separated by the "light disturbance" provided by the apparatus of GB2215320. Moreover, the apparatus of GB2215320 relies on the fact that the containers are dispensed upside down such that the open face is placed onto a hinged plate in order that the air blast is correctly directed between the containers. In contrast, the present invention seeks to remove cone sleeves from a cone stack in the correct orientation and therefore the cone sleeves cannot be dispensed with open face downwards thereby to contact any sort of plate to direct an air blast.

U.S. Pat. No. 6,623,236 discloses a vacuum picker apparatus for cups that includes a vacuum picker head with concave surface areas, each being preferably ½° reverse angle, and each surface area having a hole therethrough that allows for a vacuum to be formed at the picker head. When the vacuum is formed, the side wall of the cup is drawn, inside the overall circumference of the head at each concave surface area to provide for an effective seal to hold the cup to the picker head, which reduces deformation of the cup and facilitates its extraction for further processing. U.S. Pat. No. 6,623,236 further discloses that a protective ring or skirt at the picker head has spaced apart notches through which apertures are formed to direct a thrust of air against the stack to force the stack away from the individual cup being denested. The dual action of the vacuum picker apparatus removes an individual cup from a stack of cups and forces the stack away from the cup to facilitate removal of the individual cup from the stack. However, in this vacuum picker apparatus the picker head is inserted into the cup to remove it. Consequently the cups must be removed from the picker head after denesting. Moreover, the stack of cups are upside down, that is to say the openings of the cups are downward and the picker head is inserted upwards into them. Consequently the cups must also be rotated through 180° in order to be in the correct orientation for filling. Finally, U.S. Pat. No. 6,623,236 refers to FIG. 6A and states that until the protective ring 34 completely clears the ears 68 and edge 76 of the feed aperture 20, the air in the vicinity of the picker head is drawn up through the apertures 66 through the space 82 between the cups 22, 22' so as to push the cup 22' and hence the stack 24 away from the cup 22 as indicated by the arrow 86, which cup 22 has adhered to the picker head 14. This manner of controlling the air flow provides a force to be exerted against the cup 22' of the stack 24 so that only the cup 22 can be withdrawn on the picker head 14 as it is withdrawn through the feed aperture 20. It will therefore be appreciated that U.S. Pat. No. 6,623,236 relies on the ability of the whole of the stack to be deformable in the direction of arrow 86 and further relies on the use of the vacuum-based picker head to remove cup 22 once the stack has been so deformed. As a consequence, this apparatus is extremely complicated, limited to stacks that can be deformed as a whole and even then still requires that the separated items be correctly orientated at a later stage.

U.S. Pat. No. 2,792,967 relates to a machine for filling expendable containers made of waxed paper or the like, and more particularly to a mechanism in such a machine for feeding containers from a stack into the machine. The stack of containers is supported at its lower end by movable means, comprising a pair of hooks. The hooks terminate with inturned end portions which are adapted to hook over the edge of a scored mouth portion of the lowermost container in the stack. The machine of U.S. Pat. No. 2,792,967 also discloses that it makes provision for utilizing compressed air to separate the individual containers from the stack. However the cone sleeves of the present invention do not have such scored mouth portion that can be engaged with hooks.

There therefore remains a need for an apparatus and process that is capable of addressing the issues caused by packed stacks of cone sleeves where the cone sleeves have become too tightly packed or even wedged together. Moreover, there remains a need for such an apparatus and process that is simple, efficient and capable of dispensing sleeves in the correct orientation.

SUMMARY OF THE INVENTION

Figure 1:
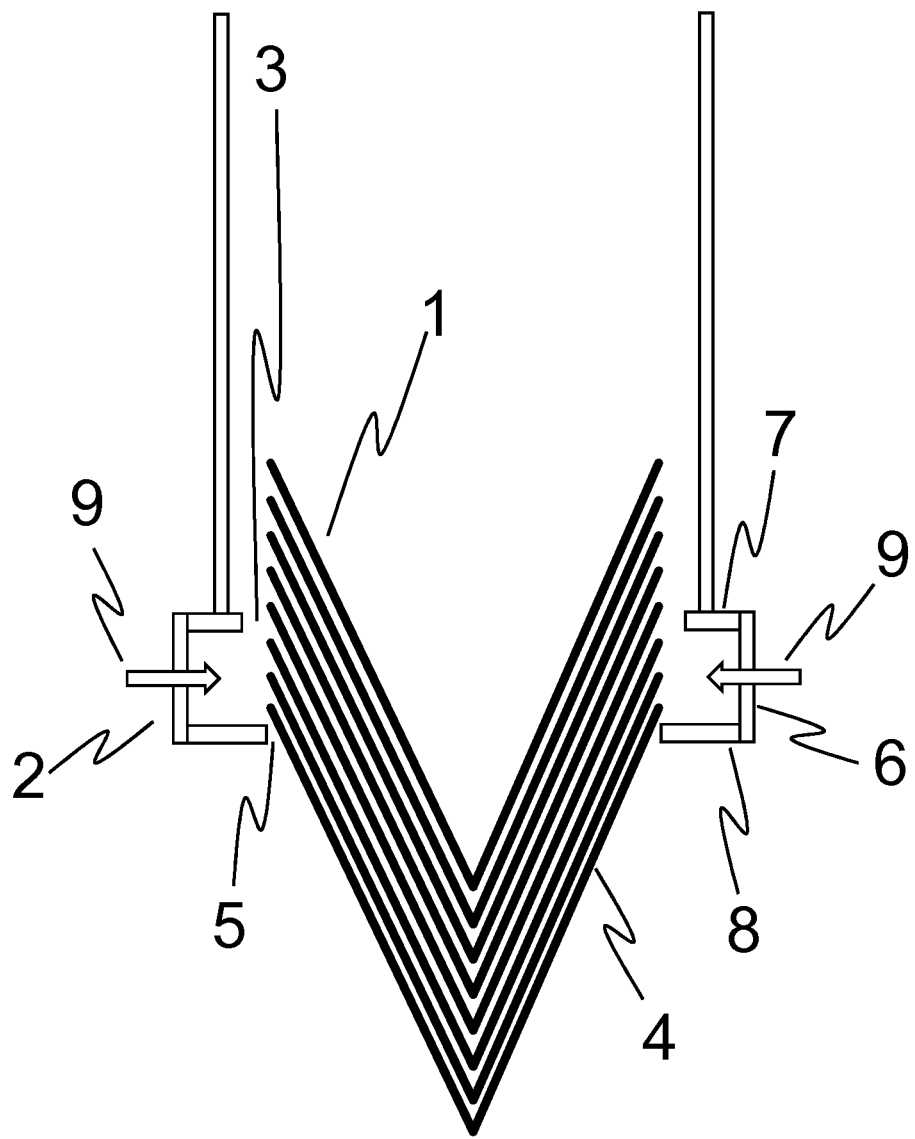
FIG. 1 shows the apparatus of the invention in use with a nested stack of cone sleeves.

We have now found that a specifically configured apparatus and a process using that apparatus address the foregoing issues.

In a first aspect the present invention therefore provides an apparatus for separating a cone sleeve from a nested stack of cone sleeves the apparatus comprising a chamber having an upper and a lower surface connected by a wall or walls, the upper surface having an upper circular opening and the lower surface having a lower circular opening characterized in that the upper circular opening has a circumference of from 100-135% of the maximum circumference of the cone sleeve, the lower circular opening has a circumference of from 95-99.5% of the maximum circumference of the cone sleeve, and the chamber has inlets connectable to a pressurized gas supply.

The openings are substantially circular, preferably they are circular.

Preferably the upper circular opening has a circumference of at least 101% of the maximum circumference of the cone sleeve, more preferably at least 102.5%, more preferably still at least 105%, even more preferably at least 110%, most preferably the upper circular opening has a circumference of at least 115% of the maximum circumference of the cone sleeve.

Preferably the upper circular opening has a circumference of at most 130% of the maximum circumference of the cone sleeve, more preferably at most 127.5%, more preferably still at most 125%, even more preferably at most 120%, yet more preferably at most 117.5%, yet more preferably still at most 115%, most preferably the upper circular opening has a circumference of at most 110% of the maximum circumference of the cone sleeve.

Preferably the lower circular opening has a circumference of at least 95.5% of the maximum circumference of the cone sleeve, more preferably at least 96%, more preferably still at least 96.5%, even more preferably at least 97%, yet more preferably at least 97.5%, most preferably the lower circular opening has a circumference at least 98% of the maximum circumference of the cone sleeve.

Preferably the lower circular opening has a circumference of at most 99.25% of the maximum circumference of the cone sleeve, more preferably at most 99%, more preferably still at most 98.75%, even more preferably at most 98.5% most preferably the lower circular opening has a circumference of at most 98.25% of the maximum circumference of the cone sleeve.

Preferably the ratio of the circumference of the upper circular opening to the circumference of the lower circular opening is at most 1.5:1, more preferably at most 1.4:1, more preferably still at most 1.25:1, even more preferably at most 1.1:1, yet more preferably at most 1.05:1, most preferably the ratio of the circumference of the upper circular opening to the circumference of the lower circular opening is at most 1.025:1.

The ratio of the circumference of the upper circular opening to the circumference of the lower circular opening is preferably at least 1.005:1, more preferably still at least 1.01:1, even more preferably at least 1.015:1, most preferably the ratio of the circumference of the upper circular opening to the circumference of the lower circular opening is at least 1.02:1.

Preferably the chamber is circular in cross section when viewed from above.

Preferably the minimum distance from the wall of the chamber to the edge of the upper circular opening is at least 5 mm, more preferably at least 10 mm, most preferably at least 15 mm.

Preferably the minimum distance from the wall of the chamber to the edge of the upper circular opening is at most 40 mm, more preferably at most 30 mm, most preferably at most 20 mm.

Preferably the distance between the upper surface and the lower surface as measured inside the chamber is at least 5 mm, more preferably at least 10 mm, more preferably still at least 15 mm, even more preferably at least 20 mm, yet more preferably at least 25 mm, even more preferably still at least 30 mm, yet more preferably at least 35 mm, most preferably the distance between the upper surface and the lower surface is at least 40 mm.

Preferably the distance between the upper surface and the lower surface as measured inside the chamber is at most 100 mm, more preferably at most 90 mm, more preferably still at most 80 mm, even more preferably at most 70 mm, most preferably the distance between the upper surface and the lower surface is at most 60 mm.

Preferably the apparatus has 10 inlets, more preferably 9, more preferably still 8, even more preferably 7, yet more preferably 6, even more preferably still 5, yet more preferably still at least 4, most preferably the apparatus has 3 inlets.

Preferably the inlets are equally spaced around the chamber.

Preferably the inlets are located in the wall of the chamber.

Preferably the inlets are circular in shape, more preferably the inlets are flat slits.

Preferably the inlets have a size of at least 1 $mm^2$, more preferably at least 5 $mm^2$, more preferably still at least 10 $mm^2$, even more preferably at least 20 $mm^2$, yet more preferably at least 30 $mm^2$, even more preferably still at least 40 $mm^2$, yet more preferably at least 45 $mm^2$, most preferably the inlets have a size of at least 50 $mm^2$.

Preferably the inlets have a size of at most 200 $mm^2$, more preferably at most 175 $mm^2$, more preferably still at most 150 $mm^2$, even more preferably at most 125 $mm^2$, yet more preferably at most 100 $mm^2$, even more preferably still at most 85 $mm^2$, yet more preferably at most 75 $mm^2$, most preferably the inlets have a size of at most 60 $mm^2$.

Preferably the inlets are configured to direct air horizontally into the chamber, more preferably the inlets are configured to direct air downwards into the chamber.

The pressurized gas supply may comprise pressurized air, compressed air, or pumped air.

Preferably the apparatus comprises a cone sleeve stack holder.

Preferably the cone sleeve stack holder holds, contains or comprises a nested stack of standard cone sleeves having normal pointed tips, more preferably it comprises a nested stack of sleeves having rounded tips, more preferably still it comprises a nested stack of frustoconical sleeves that have no tips at all.

Preferably the apparatus comprises automated cone sleeve removal means.

In a second aspect the present invention provides a process that employs the apparatus of the first aspect, the process comprising the steps of:
a) providing a stack of nested cone sleeves;
b) placing the lowermost end of the stack into the chamber from above the chamber; and
c) allowing the lowermost cone sleeve to sit within the lower circular opening and allowing the cone sleeves above the lowermost cone sleeve to protrude from the top of the chamber characterised in that pressurized gas is introduced into the chamber via the inlets thereby to create an elevated pressure within the chamber.

Preferably the elevated pressure in the chamber is at least 100 kPa, more preferably at least 110 kPa, more preferably still at least 120 kPa, yet more preferably at least 130 kPa, even more preferably at least 140 kPa, most preferably at least 150 kPa.

Preferably the elevated pressure in the chamber is at most 200 kPa, more preferably at most 190 kPa, more preferably still at most 180 kPa, yet more preferably at most 170 kPa, most preferably at most 160 kPa.

DETAILED DESCRIPTION OF THE INVENTION

As discussed above, it is difficult to consistently and accurately remove the lowermost sleeve from nested stacks of cone sleeves because the identically shaped sleeves naturally fit together and become stuck or wedged. When the sleeves pack tightly one within another, a vacuum is created between them that must be overcome when removing each sleeve. It is therefore a common problem that a sleeve cannot be removed from the bottom of a stack by an automated picking device. It is also a common problem that more than one sleeve is removed from the stack.

The apparatus of the present invention can be used to separate a cone sleeve from a nested stack of cone sleeves as follows.

The apparatus has a chamber defined by upper and lower surfaces that are connected by a wall. Each of the upper and lower surfaces has a circular opening through which a cone sleeve can fit. It will be appreciated that the shape of cone sleeves depends on the shape of the cone that they are designed to contain and in the context of the present invention the cones sleeves are hollow conical three-dimensional objects with a circular opening at one end into which the cone itself is introduced and at the other end the wall of the sleeve terminates at a tip. The walls of these cone sleeves taper in a substantially straight line from the circular opening to the tip. Therefore the widest point of cone sleeves is the opening of the cone sleeve and while the circular openings on the upper and lower surfaces of the apparatus are configured to accommodate this widest point and are substantially circular they need not be perfectly circular in shape and this invention is not limited to perfectly circular openings. However, it is preferred that the openings are circular to correspond to the circular shape of the cone sleeve.

As will be understood from the following description, the upper circular opening is the same size as or slightly larger than the maximum circumference of the cone sleeve (i.e. the opening of the cone sleeve) and the lower circular opening is slightly smaller than the maximum circumference of the cone sleeve.

The upper circular opening has a circumference of at least 100% of the maximum circumference of the cone sleeve, preferably at least 101%, more preferably at least 102.5%, more preferably still at least 105%, even more preferably at least 110%, most preferably the upper circular opening has a circumference of at least 115% of the maximum circumference of the cone sleeve. The upper circular opening has a circumference of at most 135% of the maximum circumference of the cone sleeve, preferably at most 130%, more preferably at most 127.5%, more preferably still at most 125%, even more preferably at most 120%, yet more preferably at most 117.5%, yet more preferably still at most 115%, most preferably the upper circular opening has a circumference of at most 110% of the maximum circumference of the cone sleeve.

The lower circular opening has a circumference of at least 100% of the maximum circumference of the cone sleeve, preferably 95.5%, more preferably at least 96%, more preferably still at least 96.5%, even more preferably at least 97%, yet more preferably at least 97.5%, most preferably the lower circular opening has a circumference of at least 98% of the maximum circumference of the cone sleeve. The lower circular opening has a circumference of at most 99.5% of the maximum circumference of the cone sleeve, preferably 99.25%, more preferably at most 99%, more preferably still at most 98.75%, even more preferably at most 98.5%, most preferably the lower circular opening has a circumference of at most 98.25% of the maximum circumference of the cone sleeve.

Preferably the ratio of the circumference of the upper circular opening to the circumference of the lower circular opening is at most 1.5:1, more preferably at most 1.4:1, more preferably still at most 1.25:1, even more preferably at most 1.1:1, yet more preferably at most 1.05:1, most preferably the ratio of the circumference of the upper circular opening to the circumference of the lower circular opening is at most 1.025:1. The ratio of the circumference of the upper circular opening to the circumference of the lower circular opening is at least 1:1, more preferably at least 1.005:1, more preferably still at least 1.01:1, even more preferably at least 1.015:1, most preferably the ratio of the circumference of the upper circular opening to the circumference of the lower circular opening is at least 1.02:1

This configuration ensures that a nested stack of cone sleeves can be introduced into the chamber, tip-first, through the upper circular opening and the lowermost sleeve will sit within and be held in place by the lower circular opening. In this configuration the lower circular opening is therefore blocked by the lowermost sleeve and the upper rim of this sleeve is located within the chamber. The sleeve or sleeves immediately above the lowermost sleeve are also located inside the chamber while the remainder of the stack protrudes from the top of the chamber. As a consequence the upper circular opening is partially blocked by the cones in the stack. The chamber is therefore effectively sealed at the bottom and the upper opening is at least partially occluded by the cone sleeves. In this configuration the upper circular opening allows the cone stack to enter the chamber but surprisingly ensures that the when the pressurized air enters the chamber through the inlets at a certain rate, the air can only escape from the chamber at a slower rate, thereby creating a pressurized environment within the chamber.

The chamber itself can be of various shapes but it is preferred to be circular in cross section when viewed from above such that it corresponds to the circular cross section of the sleeves to be processed. Such a shape ensures that the pressure applied in the chamber is largely equalized throughout the chamber and therefore provides a more consistent denesting performance.

In order to ensure that the internal volume of the chamber is optimized for pressurization, and therefore for denesting performance, the minimum distance from the wall of the chamber to the edge of the upper circular opening is preferably at least 5 mm, more preferably at least 10 mm, most preferably at least 15 mm. Preferably the minimum distance from the wall of the chamber to the edge of the upper circular opening is at most 40 mm, more preferably at most 30 mm, most preferably at most 20 mm.

As mentioned above, the sleeve or sleeves immediately above the lowermost sleeve are also located inside the chamber while the remainder of the stack protrudes from the top of the chamber. The distance between the upper surface and the lower surface as measured inside the chamber is therefore preferably at least at least 5 mm, more preferably at least 10 mm, more preferably still at least 15 mm, even more preferably at least 20 mm, yet more preferably at least 25 mm, even more preferably still at least 30 mm, yet more preferably at least 35 mm, most preferably the distance between the upper surface and the lower surface is at least 40 mm. Preferably the distance between the upper surface and the lower surface as measured inside the chamber is at most 100 mm, more preferably at most 90 mm, more preferably still at most 80 mm, even more preferably at most 70 mm, most preferably the distance between the upper surface and the lower surface is at most 60 mm. This configuration ensures that in addition to the lowermost cone sleeve, there are also sufficient cones present in the chamber to facilitate denesting.

The pressurized air is delivered to the chamber via inlets and preferably the apparatus has 10 inlets, more preferably 9, more preferably 8, even more preferably 7, yet more preferably 6, even more preferably still 5, yet more preferably still at least 4, most preferably the apparatus has 3 inlets. The inlets are preferably substantially equally spaced around the chamber. The inlets are preferably located in the wall of the chamber and while they can be various shapes they are preferably circular. More preferably the inlets are a flat slit because it has been found that this shape is actually capable of creating an air blade that interacts with the cone sleeves and provides enhanced denesting performance.

The size of the inlets can be varied to ensure rapid pressurization of the chamber and/or effective performance as air blades. The inlets therefore preferably have a size of at least 1 mm$^2$, more preferably at least 5 mm$^2$, more preferably still at least 10 mm$^2$, even more preferably at least 20 mm$^2$, yet more preferably at least 30 mm$^2$, even more preferably still at least 40 mm$^2$, yet more preferably at least 45 mm$^2$, most preferably the inlets have a size of at least 50 mm$^2$ and preferably at most 200 mm$^2$, more preferably at most 175 mm$^2$, more preferably still at most 150 mm$^2$, even more preferably at most 125 mm$^2$, yet more preferably at most 100 mm$^2$, even more preferably still at most 85 mm$^2$, yet more preferably at most 75 mm$^2$, most preferably the inlets have a size of at most 60 mm$^2$.

In order to further enhance the separation of the cone sleeves the inlets are preferably configured to direct air horizontally into the chamber, more preferably the inlets are configured to direct air downwards into the chamber. In this configuration the air is capable of interacting with the lowermost sleeve and thereby facilitates denesting.

Various pressurized gas supplies may be connected to the inlets such as pressurized air, compressed air, or air pump devices but the invention is not limited by the type of pressurized gas supply.

In order to guide the stack of cone sleeves into the chamber the apparatus may also contain a cone sleeve stack holder such as a hollow tube or a similar cartridge. Preferably the cone sleeve stack holder may contain a nested stack of standard cone sleeves having normal pointed tips. It may also contain a nested stack of sleeves having rounded tips. It may also contain frustoconical sleeves that have no tips at all (i.e. the precursor cone sleeves for sleeves having rounded tips).

In order to remove the lowermost sleeve, the apparatus may also have an automated cone sleeve removal means located below the chamber. The automated cone sleeve removal means are capable of removing the lowermost cone sleeve from the chamber once it has been denested from the rest of the stack.

The present invention also provides a process that employs the foregoing apparatus. The process will be described with reference to FIGS. 1 and 2. In the process of the invention, a stack of nested cone sleeves 1 is introduced tip-downwards into the chamber 2 from above i.e. via the upper circular opening 3. The lowermost cone sleeve 4 of the stack sits within the lower circular opening 5 and the cone sleeves above it in the stack 1 protrude from the top of the chamber 2. The chamber is defined by the wall 6, the upper surface 7 and the lower surface 8.

As discussed above, in this configuration, the nested stack of cone sleeves 1 sits within the chamber 2 such that the lower circular opening 5 is blocked by the lowermost sleeve 4 and the upper rim of this sleeve 4 is located within the chamber 2. The sleeve or sleeves immediately above the lowermost sleeve are also located inside the chamber while the remainder of the stack protrudes from the top of the chamber. The upper opening 3 is therefore partially blocked by the cones in the stack. The chamber 2 is effectively sealed at the bottom 5 and the upper opening 3 is almost completely occluded by the other cone sleeves.

In the process of the invention, pressurized gas is introduced into the chamber 2 via the inlets 9 to create an elevated pressure within the chamber. This pressure elevation occurs because the pressurized air enters the chamber 2 through the inlets 9 at a rate greater than the rate that the air can escape via the upper circular opening 3. A pressurized environment is therefore created within chamber 2. Preferably the pressure in the chamber is at least 100 kPa, more preferably at least 110 kPa, more preferably still at least 120 kPa, yet more preferably at least 130 kPa, even more preferably at least 140 kPa, most preferably at least 150 kPa. Preferably the pressure in the chamber is at most 200 kPa, more preferably at most 190 kPa, more preferably still at most 180 kPa, yet more preferably at most 170 kPa, most preferably at most 160 kPa.

Figure 2:
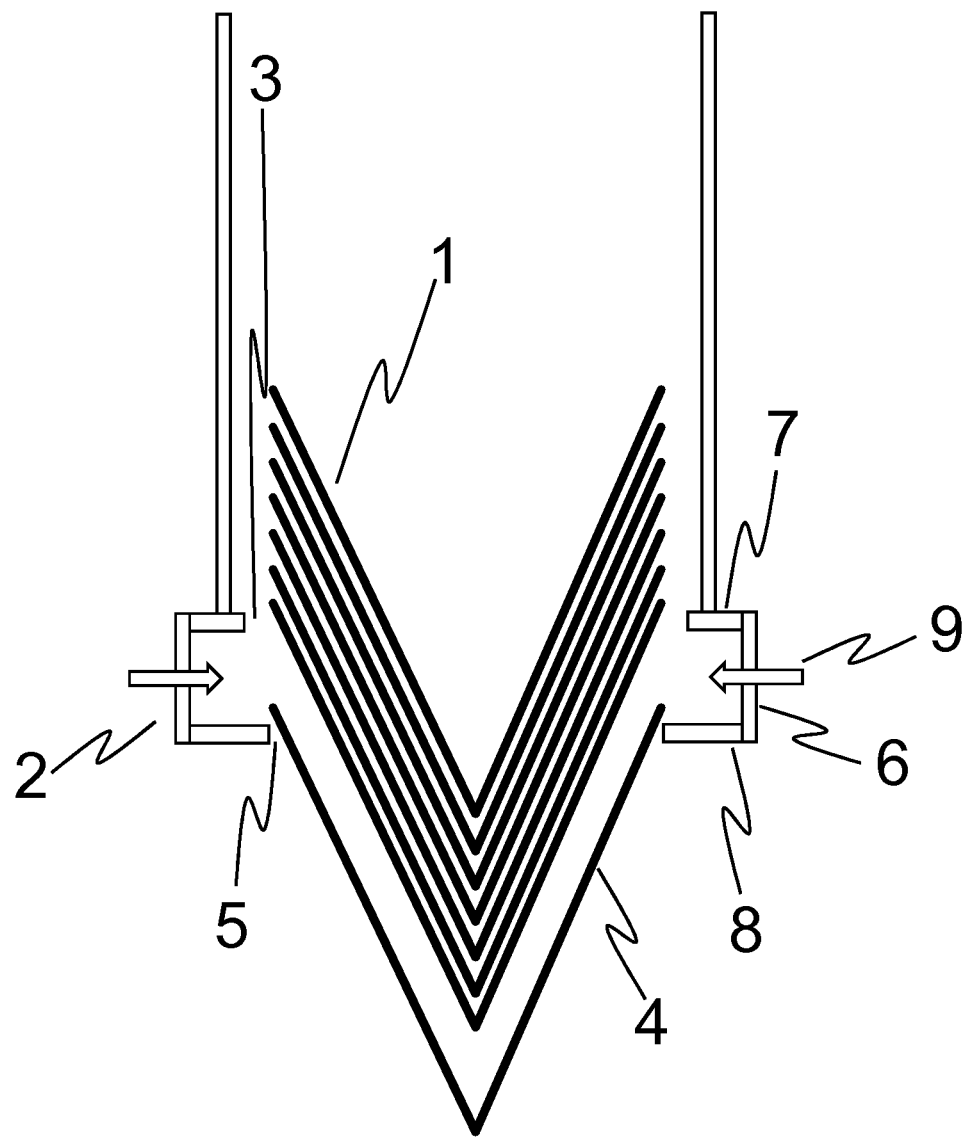
FIG. 2 shows the apparatus of the invention in use having separated the lowermost cone sleeve from the stack.

As a consequence of this elevated pressure and of the air escaping through the narrow annular space between the cone stack and the edge of the upper circular opening 3, the lowermost cone sleeve is forced apart from the rest of the stack. It has surprisingly been found that the apparatus and process of the invention are actually capable of causing the rest of the stack to float above the lowermost cone as shown in FIG. 2. When a preferred embodiment of the invention is used, the inlets create an air blade that actually interacts with the cone sleeves. In this embodiment, not only is the cone stack floated above the lowermost cone but the air blade can also be used to infiltrate the vacuum between the cone sleeves, hence further enhancing separation. In a further embodiment the inlets are configured to direct air downwards into the chamber and in this configuration not only does the air infiltrate between the cone sleeves but also serves to force the lowermost cone downwards as the air pressure within the chamber forces the rest of the stack upwards.

Except in the operative and comparative examples, all numbers in the description indicating amounts of materials, conditions of reaction, physical properties of materials, and/or use are to be understood as being preceded by the word "about".

Where values are disclosed as a range of upper and/or lower and/or preferred limits, all limits may be combined thereby to describe preferred ranges.

The invention claimed is:

1. An apparatus for separating a cone sleeve (4) from a nested stack of cone sleeves (1), the apparatus comprising a chamber (2) having an upper (7) and a lower (8) surface connected by a wall or walls (6), the upper surface (7) having an upper circular opening (3) and the lower surface (8) having a lower circular opening (5) characterised in that
the upper circular opening (3) has a circumference from 100 to 135% of a maximum circumference of the cone sleeve (4),
the lower circular opening (5) has a circumference from 95 to 99.5% of the maximum circumference of the cone sleeve (4), thereby creating an effective seal between a bottommost cone sleeve and the chamber, and
the chamber (2) has inlets (9) connectable to a pressurised gas supply, wherein the inlets (9) are configured to direct gas horizontally or downwards into the chamber and at a rate greater than the gas can escape via the upper circular opening so as to create an elevated pressure within the chamber that causes the lowermost cone sleeve to be separated from the rest of the cone sleeve stack.

2. An apparatus according to claim 1 wherein the upper circular opening (3) has a circumference of at least 101% of the maximum circumference of the cone sleeve (4).

3. An apparatus according to claim 1 wherein the upper circular opening (3) has a circumference of at most 130% of the maximum circumference of the cone sleeve (4).

4. An apparatus according to claim 1 wherein the lower circular opening (5) has a circumference of at least 95.5% of the maximum circumference of the cone sleeve (4).

5. An apparatus according to claim 1 wherein the lower circular opening (5) has a circumference of at most 99.25% of the maximum circumference of the cone sleeve (4).

6. An apparatus according to claim 1 wherein the distance between the upper surface (7) and the lower surface (8) is at least 5 mm.

7. An apparatus according to claim 1 wherein the distance between the upper surface (7) and the lower surface (8) as measured inside the chamber is at most 100 mm.

8. An apparatus according to claim 1 wherein the inlets (9) are configured to direct gas downwards into the chamber.

9. An apparatus according to claim 1 wherein the apparatus comprises a cone sleeve stack holder.

10. An apparatus according to claim 9 wherein the cone sleeve stack holder comprises a nested stack of sleeves having rounded tips.

11. A process that employs the apparatus of claim 1, the process comprising the steps of:
a) providing a stack of nested cone sleeves (1);
b) placing the lowermost end of the stack into the chamber (2) from above the chamber (2); and
c) allowing the lowermost cone sleeve (4) to sit within the lower circular opening (5) and allowing the cone sleeves above the lowermost cone sleeve (4) to protrude from the top of the chamber (2)
characterised in that pressurised gas is introduced into the chamber via the inlets (9) thereby to create an elevated pressure within the chamber (2).

12. A process according to claim 11 wherein the elevated pressure in the chamber (2) is at least 100 kPa.

13. A process according to claim 11 wherein the elevated pressure in the chamber (2) is at most 100 kPa.

14. An apparatus for separating a cone sleeve (4) from a nested stack of cone sleeves (1), the apparatus comprising a chamber (2) having an upper (7) and a lower (8) surface connected by a wall or walls (6), the upper surface (7) having an upper circular opening (3) and the lower surface (8) having a lower circular opening (5) wherein the ratio of the circumference of the upper circular opening (3) to the circumference of the lower circular opening (5) is at most 1.5:1 wherein the lower circular opening (5) has a circumference from 95 to 99.5% of the maximum circumference of the cone sleeve (4) thereby creating an effective seal between a bottommost cone sleeve and the chamber and wherein the inlets (9) are configured to direct air horizontally or downwards into the chamber and at a rate greater than the air can escape via the upper circular opening so as to create an elevated pressure within the chamber that causes the lowermost cone sleeve to be separated from the rest of the cone sleeve stack.

* * * * *